United States Patent
Maier et al.

[11] 3,728,572
[45] Apr. 17, 1973

[54] INCANDESCENT LAMP WITH REGENERATIVE CYCLE

[75] Inventors: Gerhard Maier; Siegfried Henes, both of Herbrechtingen, Germany

[73] Assignee: Patent-Treuhand-Gesellschaft fur Elektrische Gluhlamper mbH, Munich, Germany

[22] Filed: July 30, 1971

[21] Appl. No.: 167,631

[30] Foreign Application Priority Data

Sept. 18, 1970 Germany............P 20 46 186.3

[52] U.S. Cl. ..............................313/222
[51] Int. Cl. ...............................H01k 1/50
[58] Field of Search........................313/222

[56] References Cited
UNITED STATES PATENTS 3,364,376  1/1968  Collins et al..................313/222

*Primary Examiner*—Roy Lake
*Assistant Examiner*—Darwin R. Hostetter
*Attorney*—Robert D. Flynn et al.

[57] ABSTRACT

Halogen incandescent lamp with tungsten filament contains inert fill gas and has a partial bromine pressure sufficient for the regenerative cyclic process; the fill gas additionally contains an additive of from 0.05 to 0.5 vol. percent of carbon monoxide; due to the CO additive it is possible to reduce the quantity of bromine necessary for the regenerative cycle to less than 10 percent otherwise necessary under the same conditions.

1 Claim, 1 Drawing Figure

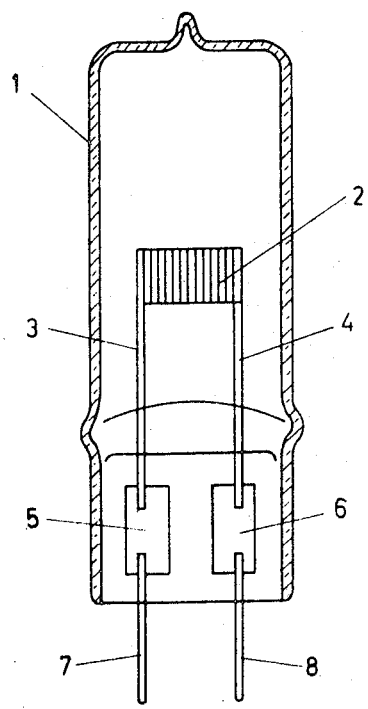
Dr. Gerhard Maier
Dr. Siegfried Henes
INVENTORS
BY Flynn & Frishauf
ATTORNEY

INCANDESCENT LAMP WITH REGENERATIVE CYCLE

The invention relates to incandescent lamps having a tungsten filament and an inert gas filling with an additive of bromine or hydrogen bromide to provide for a regenerative cycle. In operation, incandescent lamps of this type have a partial bromine pressure which effects interception of tungsten particles evaporating off the filament so that these particles do not reach the wall of the lamp envelope but are transported back to the filament. Incandescent lamps with regenerative cycle are not blackened throughout their useful lives and deliver an approximately constant luminous output during their operational life.

In manufacture of such incandescent lamps, a measured quantity of brominated hydrocarbons is added to the inert fill gas of the lamp. The brominated hydrocarbons such as, for instance, dibromomethane are thermally decomposed by heating after introduction into the lamp bulb during initial flashing of the lamps, or even already during introduction of the gas mixture when they are passing through the exhaust stem (see U.S. Pat. No. 3,418,512; U.S. Pat. No. 3,588,602 ). When the brominated hydrocarbons are thermally decomposed during operation of the lamp, to supply the partial bromine pressure necessary for the necessary for the regenerative cycle, elementary carbon is also formed (beside the elementary bromine and hydrogen bromide). The carbon may deposit on the wall inside the lamp bulb or it may form carbide together with the tungsten filament. The formation of the carbide effects an embrittlement of the filament, which is highly undesirable.

It is an object of the invention to provide incandescent lamps with regenerative cycle which have a minor additive of bromine or hydrogen bromide to the inert fill gas, without impairing the luminous efficiency or useful life.

SUBJECT MATTER OF THE INVENTION

The incandescent lamps comprise a tungsten filament and an inert gas filling with an additive of bromine or hydrogen bromide for the generation of a partial bromine pressure sufficient to initiate the regenerative cycle; and an additive to the inert fill gas of carbon monoxide of from 0.05 to 0.5 vol percent.

Due to the low proportion of brominated hydrocarbons in the fill gas, the quantity of elementary carbon which is liberated in the course of lamp manufacture during the thermal decomposition is so unimportant that an embrittlement of the filament and of its supports and thus danger of breakage of the filaments in lamps having thin wires, due to possible carbide formation, is prevented. The luminous efficiency is increased because only small quantities of carbon can deposit on the bulb wall. The mass production of the lamps is simplified, accelerated and its cost decreased.

In tests concerning the regenerative cyclic process in incandescent lamps with an additive of iodine, it was found that a minor quantity of oxygen must be present in the gas filling. Moreover, iodine cycle incandescent lamps have been described having an inert fill gas containing an additive of carbon monoxide at a partial pressure of from 0.2 to 7.5 torr. The carbon monoxide is intended to serve as the supplier of oxygen for the regenerative cycle (see U.S. Pat. No. 3,364,376). Tungsten bromine compounds containing oxygen as a factor in a regenerative cycle with bromine have recently been considered. Possibly the carbon monoxide added to the lamps according to the invention might serve as the oxygen source. An exact scientific explanation for the effect of the carbon monoxide additive in case of bromine cycle incandescent lamps is not now available, but it is not necessary for an understanding of the invention.

The invention will described with reference to incandescent projection lamps of 36 V, 400 W, as an example. Such lamps are commercially available from Osram, Germany, (Order No. 64,663).

Normally, the lamps are filled with krypton at a pressure of 2,500 torr while 0.6 percent of dibromomethane is additionally admixed to the inert gas. According to the invention, 0.15 percent of carbon monoxide is admixed to the inert gas (krypton), and the quantity of dibromomethane necessary for the regenerative cyclic process may be reduced to 0.05 percent without changing the characteristics of the projection lamps. The useful life of the lamps comprising the carbon monoxide additive according to the invention is equal to the useful life of the lamps without carbon monoxide additive and having the increased amount of dibromomethane additive. The luminous efficiency of the lamp with CO additive and the lesser amount of dibromomethane is increased by about 3 percent. The reason for the increase in luminous efficiency might be the lesser quantity of elementary carbon which is deposited on the inner wall surface of the lamp bulb during the thermal decomposition of the admixed dibromomethane. Due to the carbon monoxide additive, the necessary quantity of brominated hydrocarbons which is admixed to the inert gas for the regenerative cycle may be reduced substantially as, for instance, in the present example to less than 10 percent of the hitherto required quantity of dibromomethane.

The invention will be described by way of example with reference to the accompanying drawing, wherein:

The drawing shows an incandescent lamp according to the invention. 1 designates the lamp bulb of quartz glass. Inside the lamp bulb, the tungsten filament 2 is supported by the support wires 3 and 4. The support wires are connected with molybdenum foils 5 and 6 which, in known way, are pinch sealed into the quartz glass. The base pins 7 and 8 leading outwards are attached to the molybdenum foils. The interior of the lamp bulb is filled with inert gas such as krypton at a pressure of 2,500 torr, and with an additive of 0.05 percent of dibromomethane and as well as with the additive according to the invention, of 0.15 percent of carbon monoxide.

Of course, the invention is also applicable — apart from incandescent projection lamps — to all the other incandescent lamps comprising a regenerative cycle caused by a sufficient partial bromine pressure. Moreover, the incandescent lamps may contain also several filaments.

The reduction in bromine or hydrogen bromide with respect to lamps without the CO additive may be anywhere from none to 5 percent of previously used amounts; and the amount of CO additive may be from 0.05 to 0.5 percent (by volume) of the fill gas. The relative proportions can be varied within wide ranges, depending on lamp interior and envelope design and structure. Generally, CO is easy to handle and inexpensive and a fill additive in the range of from 0.1 to 0.3 percent (by volume of fill gas) is a suitable range, permitting reduction of the brominated hydrocarbon to about 0.03 to 0.06 percent (by volume of fill gas) with substantially equal lamp life and no less and possibly somewhat increased light output.

We claim:

1. Incandescent lamp comprising an envelope;
a tungsten filament and an inert gas fill within the envelope, the fill having an additive of bromine or hydrogen bromide in the amount of from 0.03 to 0.06 vol percent of the fill gas for the generation of a partial bromine pressure which is sufficient to initiate the regenerative cycle; and
an additive of from 0.05 to 0.5 vol percent of carbon monoxide.

* * * * *